(12) United States Patent
Henton

(10) Patent No.: US 7,277,851 B1
(45) Date of Patent: Oct. 2, 2007

(54) AUTOMATED CREATION OF PHONEMIC VARIATIONS

(75) Inventor: Caroline G. Henton, Santa Cruz, CA (US)

(73) Assignee: Tellme Networks, Inc., Mountain View, CA (US)

( * ) Notice: Subject to any disclaimer, the term of this patent is extended or adjusted under 35 U.S.C. 154(b) by 974 days.

(21) Appl. No.: 09/721,373

(22) Filed: Nov. 22, 2000

(51) Int. Cl.
G10L 15/00 (2006.01)
(52) U.S. Cl. ............................ 704/235; 704/231; 704/9
(58) Field of Classification Search ............... 704/243, 704/254, 10, 251, 235, 231, 9
See application file for complete search history.

(56) References Cited

U.S. PATENT DOCUMENTS

| 5,500,920 | A | * | 3/1996 | Kupiec ..................... 704/270.1 |
| 5,623,609 | A | * | 4/1997 | Kaye et al. ..................... 704/1 |
| 5,855,000 | A | * | 12/1998 | Waibel et al. ............... 704/235 |
| 5,913,192 | A | * | 6/1999 | Parthasarathy et al. .. 704/256.1 |
| 6,108,627 | A | * | 8/2000 | Sabourin ..................... 704/243 |
| 6,154,758 | A | | 11/2000 | Chiang |
| 6,188,984 | B1 | | 2/2001 | Manwaring et al. |
| 6,493,744 | B1 | | 12/2002 | Emens et al. |
| 6,618,697 | B1 | | 9/2003 | Kantrowitz et al. |

OTHER PUBLICATIONS

Pitt, Phonological processes and the perception of phonotctically illegal consonant clusters, 1998, Perception & Psychophysics, 60, pp. 941-951.*

Ali et al. (Intrusive stops in nasa-fricative clusters, an aero-dynamic & acoustic investigation, 1979, Phonetica, 36, pp. 35-97.*

SAMPA, Computer readable phonetic alphabet, Jan. 28, 1997, http://web.archive.org/web/19970128063836/http://www.phon.ucl.ac.uk/home/sampa/home.htm, pp. 1-3.*

Merriam-Webster Online, Dec. 5, 1998, http://web.archive.org/web/19981205142949/http://www.m-w.com/, pp. 1-5.*

Vitevich et al. (Phonotactics & Syllable Implications for the processing of spoken nonsense words, 1997, Language and Speech, 40, pp. 47-62).*

J. J. Humphries et al.; "The Use of Accent-Specific Pronunciation Dictionaries in Acoustic Model Training"; Proceedings ICASSP 1998; vol. 1; pp. 317-320.

Jeff C. Kunins et al.; U.S. Appl. No. 09/592,241; "Method and Apparatus for Zero-Footprint Phone Application Development" filed June 13, 2000.

* cited by examiner

Primary Examiner—Patrick N. Edouard
Assistant Examiner—Lamont Spooner
(74) Attorney, Agent, or Firm—Perkins Coie LLP

(57) ABSTRACT

A method of generating a phonemic transcription for a word using a computer system is described. In one embodiment, an existing pronunciation generation program is applied to generate an initial transcription. The initial transcription can then be evaluated to identify likely bad pronunciations by looking for phonotactically impossible co-occurrences. Additionally, one or more rules can be applied to generate additional phonemic transcriptions. The resulting transcriptions may be used in place of the initial transcription and/or in addition to the initial transcription. Additionally, when multiple transcriptions result, the transcriptions are ordered according to preference and/or likelihood of use.

39 Claims, 2 Drawing Sheets

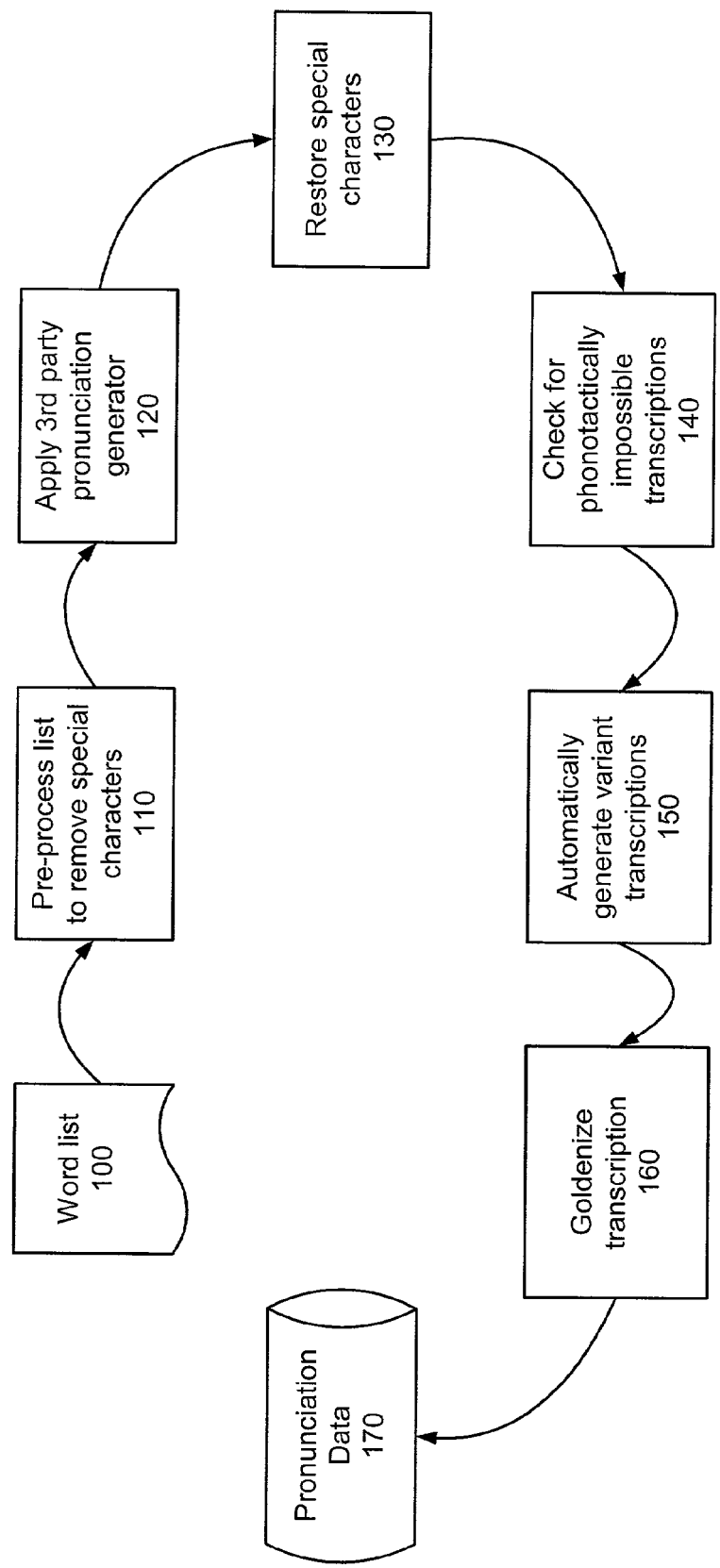

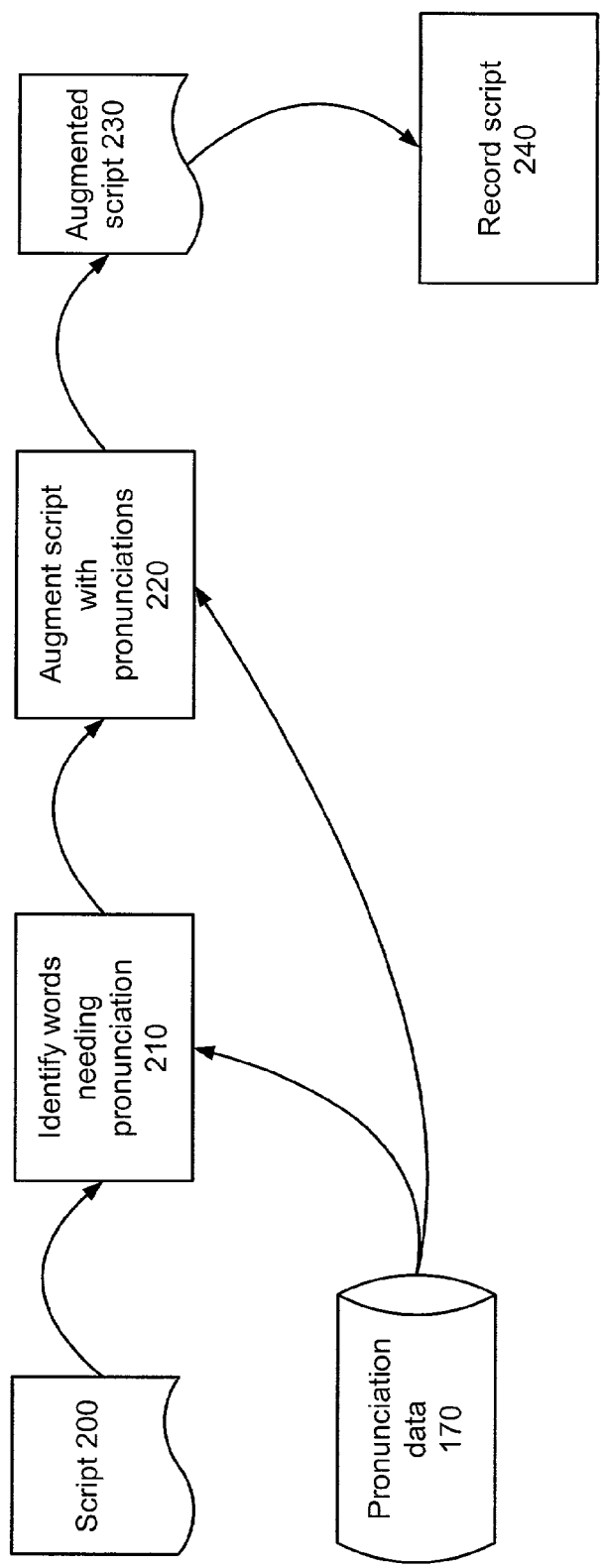

AUTOMATED CREATION OF PHONEMIC VARIATIONS

BACKGROUND OF THE INVENTION

1. Field of the Invention

This invention relates to the field of phonetics. In particular, the invention relates to technologies for creating phonetic variations automatically for given pronunciations of individual words.

2. Description of the Related Art

A. Notation

Before turning to definitions, some notational concerns will be addressed. A standard notational alphabet, the International Phonetic Alphabet (IPA) can be used to represent the pronunciation of words using phonemes. However, the IPA uses symbols that are difficult to represent easily in ASCII systems and further many of the symbols lack appropriate representational glyphs in standard computer fonts. (Newer systems that handle Unicode can represent IPA symbols directly and frequently include newer fonts with appropriate glyphs for IPA symbols.) Accordingly, it is more convenient and has become industry standard practice to use the Computer Phonetic Alphabet (CPA) in computer speech recognition and pronunciation generation tools such as "autopron", from Nuance Communications, Menlo Park, Calif. and "namepro", from E-Speech Corporation, Princeton, N.J.

The CPA has the advantage that it can be represented using standard ASCII characters using the glyphs in commonly available fonts. The following table shows the correspondence between CPA and IPA symbols for American English.

TABLE 1

American English: Computer Phonetic Alphabet (CPA) to
International Phonetic Alphabet (IPA) Correspondence

| CPA | Example | IPA | CPA | IPA | CPA | IPA |
|---|---|---|---|---|---|---|
| Vowels | | | Stops | | Fricatives | |
| i | fleet | i | p | p | f | f |
| I | dimple | I | t | t | T | Θ |
| e | date | eI | k | k | s | s |
| E | bet | ε | b | b | S | ʃ |
| a | cat | æ | d | d | v | v |
| aj | side | aI | g | g | D | ð |
| Oj | toy | ɔI | Flaps | | z | z |
| ˆ | cut | Λ | ! | ! | Z | 3 |
| u | blue | u | Nasals | | h | h |
| U | book | ʊ | m | m | Approximants | |
| o | show | oʊ | n | n | j | j |
| O | caught | ɔ | g~ | ŋ | r | ɹ |
| A | father, cot | α | Affricates | | w | w |
| aw | couch | aʊ | tS | tʃ | l | l |
| *r | bird | ɚ | dZ | d₃ | | |
| * | alive | ə | | | | |

Throughout the remainder of this document, the CPA symbols will be used to represent phonemes in transcriptions.

The range of possible sounds that a human being can produce by moving the lips, tongue, and other speech organs, are called phones. These sounds are generally grouped into logically related groups, each a phoneme. In a given language only certain sounds are distinguished (or distinguishable) by speakers of the language, i.e. they conceptualize them as different sounds. These distinguishable sounds are phonemes. In fact, a phoneme may be defined as a group of related phones that are regarded the same by speakers. The different sounds that are part of the same phoneme are called allophones (or allophonic variants).

Returning to notation issues, the phonemic transcription of a word will be shown between slashes ("/ /"). For clarity, the glyph "." will be placed between each phoneme in the transcription, e.g. /k•O•r•n•*r/ for "corner", to represent the space character visibly. In many computer programs a space character is used to represent the boundary between phonemes; however, in a printed publication using the standard glyph for the space character, " ", might lead to ambiguities, e.g. between /*r/ and /*.r/, etc.

If used, phonetic transcriptions will be shown in brackets ("[ ]"). Phonetic transcriptions distinguish between the different phones that are allophones of the phoneme.

B. Role of Phonemic Transcriptions in Speech Software

Speech recognizers (both speaker independent and speaker dependent varieties) rely on pronunciations to perform recognition. For example, in order for the Nuance(™) speech recognition software from Nuance Communications, to recognize a word in a recognition grammar, a pronunciation (e.g. phonemic transcription) must be available. To support recognition, Nuance provides a large phonemic dictionary that includes pronunciations for many American English words. The content of the dictionary typically excludes proper nouns and made up words, e.g. "Kodak"; however, there may be extensions for particular purposes, e.g. for US equity issues (stocks).

Additionally, Nuance provides an automated tool, "autopron", that attempts to generate (simply from the spelling of the word) a usable pronunciation. Other companies, e.g. E-Speech, specialize in providing software that they claim can do a better job at generating such pronunciations.

Symmetrically, a good pronunciation is also important to producing good synthesized speech (or in the case where a human is reading a script, providing the human with extra guidance about the correct pronunciation). Thus, a useful phonemic transcription is important to many aspects of computer speech technology.

C. Conclusion

Prior techniques for generating pronunciations automatically result in transcriptions that do not correspond well with the actual pronunciations used by native speakers. Further, the tools sometimes systematically generate an unwieldy number of transcriptions, e.g. dozens of possibilities for simple words, thus a correct transcription is produced as much by accident as by any systematic plan. Further, if such an unwieldy set of transcriptions were used in a large recognition grammar (e.g. when thousands of words may be recognized simultaneously) a large number of mistakes in recognition will result. Put differently, the number of bad pronunciations outweigh the correct ones and result in too much confusion for high accuracy.

In contrast, other prior techniques generate a single phonemic transcription for a given word. These transcriptions however do not necessarily match up well with common pronunciations, nor do they allow for common phonemic variations among native speakers.

Similarly, prior techniques generate phonotactically impossible transcriptions with surprising frequency.

Accordingly, what is needed is a method and apparatus for refining a computer generated phonemic transcription using one or more well defined rules to produce more accurate transcriptions as well as likely phonemic variations; the method and apparatus should also prevent (or at least identify) phonotactically impossible co-occurrences.

SUMMARY OF THE INVENTION

An approach to providing improved phonemic transcriptions for use in a variety of computer speech-related fields is described. The approach can be used with any of a number of existing automated transcription tools to improve the quality of the transcriptions and to generate likely pronunciation variants. The results of these improved transcriptions yield surprising gains (as opposed to use of existing computer generated approaches). Further, by explicitly generating likely phonemic variations a wide range of common accents and common pronunciation approaches can be handled.

Further, the improved transcriptions can be integrated with other processes relating to computer speech. For example, scripts for human voice talent can be scanned to identify words that are likely to need pronunciations. The pronunciations can be generated using the method and apparatus described herein and a preferred pronunciation from such effort inserted into the script in appropriate locations to assist the voice talent.

Similarly, the method and apparatus can be integrated into a remotely hosted development environment. In such a setting, words that require phonemic transcription can be identified either explicitly or implicitly. In one approach applications provided by multiple legal entities and supported by a single voice portal are scanned to identify grammars including words that do not have pronunciations and such pronunciations can automatically be generated (possibly without the knowledge of the application providers). In another embodiment, because of the competitive value of good quality phonemic transcriptions, application developers only have access to the phonemic transcriptions they explicitly requested and, if appropriate, paid for. For example, even if developer X had previously paid for transcription of a word such as "Kodak", developer Y would not be given access to the transcription unless she paid for it separately.

BRIEF DESCRIPTION OF THE FIGURES

FIG. 1 is a process flow diagram for generating phonemic variations.

FIG. 2 is a process flow diagram for preparing a script for audio recording.

DETAILED DESCRIPTION

A. Introduction

The process for generating phonemic variations using a computer system will be described with reference to FIG. 1. The process of FIG. 1 can be implemented using one or more computer systems with, or without, a direct human operator.

The process starts with a word list 100 comprising one or more words for transcription. The words can be represented using one or more standard character sets (e.g. ASCII, Unicode, etc.) in one or more text encodings (e.g. ISO-8859, UTF-8, UTF-16, etc.). In a preferred embodiment, each word is placed on a separate line. A portion of an exemplary word list 100 is shown below:

Marlborough
O'Reilly
Watson
Winchester
. . .

In the above example a few city names and some last names are shown. Though more generally any American English word or name could be provided. In some embodiments the word list 100 is extracted from one or more speech recognition grammar formats that associate one or more words with actions.

For purposes of this example it is assumed that words are only included in the word list 100 if there is no appropriate pronunciation for the word in the pronunciation data 170 (or other supplied pronunciation source, e.g. vendor supplied dictionary of American English, etc.) There are some instances where despite the presence of a pronunciation for a given word it would be placed through the process anyhow.

That might be the case where an attempt is being made to improve a previously provided set of pronunciations. For example, if a grammar of United States equity issues (stocks) had been previously provided, but was not performing satisfactorily, the word list 100 might contain items that had previously had pronunciations generated. Similarly, in some embodiments, to enable rapid deployment of new speech recognition grammars, the direct output of an automated transcription tool (see discussion of step 120) is temporarily inserted into the pronunciation data 170 without undergoing further screening or validation. This allows early initial recognition (e.g. for development and testing) while also allowing later tuning of the form provided by the method described herein.

The word list 100 is pre-processed at step 110 to remove special characters that are not supported by the pronunciation generator. For example, namepro from E-speech cannot handle accents, diacritic marks, and/or hyphenation properly. Accordingly, hyphenated words may be broken into two words for separate handling (and later rejoining at step 130) Similarly, the diacritics and accents can be replaced later as well.

Next, at step 120, a third party pronunciation generator (or phonemic transcription generator) is applied. These computer software programs use the spelling of words to generate phonemic transcriptions. The product is described as a third party software product because in one embodiment an existing pronunciation generator is used, e.g. namepro from E-speech. However, several of the rules and steps described herein could be directly integrated into such a product in a future revision. The approach of FIG. 1 however does offer the flexibility of working with any pronunciation generator irrespective of the origin to apply certain rule based transformations that are not well-handled by many existing systems. Further, multiple pronunciation generators can be used at step 120, e.g. to automatically compare results or build a larger list of variations.

At step 130, special characters removed at step 110 can be replaced. At this point the word list 100 typically has two columns (depending on the specific output format of the program used at step 120) such as:

| | |
|---|---|
| Marlborough | m·A·r·l·b·*·r·r·o |
| O'Reilly | o·r·a·j·l·i |
| Winchester | w·I·n·tS·E·s·t·*r |
| . . . | |

Where the word is at left and the transcription is to the right. Of course more complex formats such as database tables, extensible markup language (XML) output, and the like can also be supported.

The next step, step 140, is to look for phonotactically impossible transcriptions. Surprisingly, existing products of the sort used at step 120 generate a sufficient number of transcriptions that violate American English pronunciation rules (see below for discussion of specific rules for detection) that this step is valuable for flagging the need for additional intervention. In some instances a list of such words is output, in other embodiments, phonotactically impossible transcriptions are tagged for later manual and/or automatic handling.

Next, at step 150, one or more rules as disclosed below are applied. These rules operate to transform the output to produce either: (1) a more correct transcription or (2) variant transcriptions likely to be spoken. Applied automatically this can relieve much of the need for experienced phoneticians to hand review the output of programs of the type used in step 120. When appropriate, step 140 and step 150 can be exchanged in order and/or combined into a single step. As a convention if multiple transcriptions for a word are generated at step 150, the transcriptions are listed in order of preference or pronunciation likelihood.

Finally, at step 160, the transcription is "goldenized", that is selected as an approved transcription for use in the system. This process may be automated, manual, and/or a combination of the two. For example, transcriptions might automatically become available within the pronunciation data 170 prior to goldenization (e.g. after step 150); however, they could be flagged as such to avoid their use in secondary purposes. (See discussion of script process below.) In the case of multiple transcriptions for a single word, goldenization may include selecting the golden, e.g. preferred, pronunciation for a word. The goldenized pronunciation is the one that should be used by automatic Text-to-Speech (TTS) processes and by human voice talents in reading scripts that contain words from the word list 100 (or other words for which pronunciations have been generated). Additional, variant, pronunciations remain useful for speech recognition purposes if they represent the common variant pronunciations for a word.

Additionally, between step 150 and step 160, the transcriptions can be sent to human transcribers for manual review (and generation of additional phonetic variations). Though, in early tests of the rules below described with humans simulating step 150, most of the common variations were generated and most of the common mistakes of the programs used at step 120 were eliminated with minimal additional effort required by the transcribers. Therefore, automating the process of step 150 (either by independent computer based implementation or integration into a computer program of the type used at step 120) could produce even more substantial productivity gains in the transcription process.

Lastly, it should be noted that sometimes there is no substitute to having a human talk to a business establishment, or a local of a particular area, to determine the locally used pronunciation. For example, in Mountain View, Calif., there is a restaurant called "Vivaca" and none of the automated (or initial human) efforts to create the appropriate transcription were successful (due to the odd pronunciation the proprietor and locals use—that does not correspond to the apparent origin of the word).

B. Rules

1. Spelling "or" Should Always be /O•r/ when "or" is in Same Syllable

Syllabification is necessary to apply this rule in an automated fashion. Where possible, the syllabification can be effected automatically. In the alternate, words spelled with "or" can be flagged for manual syllabification (either before or after the process of step 120). Thus, "port" should be transcribed /p•O•r•t/ (rather than the unlikely /p•o•r•t/), while "O'Reilly" should be transcribed /o•r•aj•l•i/ ("or" is not in same syllable).

2. Spelling "wa" Should Always be /w•O/

Again, this rule corrects incorrect transcriptions (frequently as /w•A/) of programs of the sort used at step 120. Thus, "water" should be /w•O•!•*r/ (rather than the unlikely /w•A•!•*r/).

3. Prefer /O/ Over /A/ After Labio-Velars and Before Velarized Laterals

Many west-coast accents have become largely /O/-less dialects, however /O/-ful accents still outnumber /O/-less dialects in the US. (Of course, if the dialects shift, the ordering of the preferred pronunciation can be shifted as well) Accordingly, when a vowel occurs after labio-velars or before dark /l/'s (velarized laterals) it is acoustically more like /O/ than like /A/. Thus, two variant pronunciations should also be generated with the /O/form preferred and the /A/ form as variant.

So for a word like "always" both /O•l•w•e•z/ and /A•l•w•e•z/ should be generated (typically only one form is present after step 120) and the /O/ form should be listed first (or be arranged to be listed first). Further examples with the velarized laterals: "call" and "fall". Turning to labio-velars, "walk" would be transcribed as /w•O•k/ (preferred) and /w•A•k/ (variant), ditto for "wander", and so forth.

4. Application of Above to Non-Germanic and Non-English Derived Words

The above rule may need to be relaxed—or not applied—to words of foreign origin. For example "Joaquin" is most properly transcribed as /w•A•k•i•n/ (even though the labio-velar /w/ proceeds the /A/), ditto for names such as "Jamal" which should be transcribed /h•*•m•A•l/ where the /A/ is followed by a velarized lateral /l/). Ultimately, the benefits of applying the above rule outweigh the slight errors that it itself introduces. Some of these problems can be addressed by flagging words of foreign origin within the word list 100 for special handling (e.g. human review at one of step 140, step 150, and step 160).

5. Produce /A/ Primary and /O/ Secondary Variants

Continuing with /A/-/O/ issues, a number of words should have the /A/ variant as primary and an /O/ variant as secondary.

The following lists the words that should use this preference: cot, caught, bought, and dot.

6. Produce /O/ Primary and /A/ Secondary Variants

Continuing with /A/-/O/ issues, a number of words should have the /O/ variant as primary and an /A/ variant as secondary. When spelling "au" or "aw" occurs before a stop ("p", "t", "k", "b", "d", or "g") it should be pronounced /O/. For example: "Audrey", "Autumn", "Saugus", "taut", "daughter", "ought", "auxilliary", "augment", "gawp", etc., would all have a preferred pronunciation where "au" or "aw" is transcribed to /O/ as shown below for some of the words:

| | |
|---|---|
| audrey | O·d·r·i |
| audrey | A·d·r·i |
| autumn | O·t·*·m |
| autumn | A·t·*·m |
| saugus | s·O·g·*·s |
| saugus | s·A·g·*·s |

7. Avoid Over-Rhoticizing Adjacent R-Colored vowels

In transcriptions with /*r·r/, leave only initial /*r/. Thus a transcription of "Marlborough" as /m•A•r•l•b•*r•r•o/ would be transformed to /m•A•r•l•b•*r•o/. Similarly, rather than /A•t•*•l•b•*r•r•o/ for Attleborough, /A•t•*•l•b•*r•o/ would be the resulting transcription after the transformation at step 150.

8. Include Flapped Version with Fully Released /t/ and /d/ and Vice-Versa

Many programs fail to generate the flapped variant, /!/, for fully released /t/ and /d/ sounds—similarly the fully released variant should be generated for flapped variant. Preference should be given to the flapped variant.

Thus for a city such as "Winchester" if /w•I•n•tS•E•s•t•*r/ is generated, the flapped variant should be generated as preferred, e.g. /w•I•n•tS•e•s•!•*r/. Similarly, if "hendon" is generated as /h•E•n•!•*•n/ then the fully-released version should be generated as a variant (secondary to flapped variant), e.g. /h•E•n•d•*n/.

9. Handling Unstressed Vowels

The two unstressed vowels are (central) schwa, /*/, and (close) barred, /I/. The preference is for the schwa as default, but (1) if the spelling of the word includes an "i" or (2) the unstressed vowel occurs (in a disyllabic word) between two stops or coronal consonants, the barred, /I/, should be used.

Thus a transcription of "blanket" as /b•l•a•g~•k•*•t/ should be replaced by /b•l•a•g~•k•I•t/ (second part of rule for disyllabic words). Similarly, "rapid" becomes /r•a•p•I•d/ (replacing the step 120 generated /r•a•p•*•d/). As discussed for "or" rule above, syllabification can be manual, automatic and/or a combination of the two.

10. Use /^/ for stressed central vowels

A stressed central vowel should be transcribed as the vowel, /^/, not /*/. Thus "among" becomes /*•m•^•g~/, instead of /*•m•*•g~/, etc. More specifically, in a disyllabic word there should always be at least one stressed vowel. Other example words where the stressed central vowel would be appropriate: "above", "cover", "cup", and "love".

11. Spelling "ar" Should be /a•r/ when "ar" is in Same Syllable

As above for "or" spelling, syllabification is necessary. Again, this rule corrects incorrect transcriptions (frequently to /E r/) of programs of the sort used at step 120. Thus, "Daryl" should be /d•a•r•*•l/ (rather than the unlikely /d•E•r•*l/). And accordingly the first name "Mary" would be /m•E•r•i/.

This change reflects the fact that the /a/ and /E/ vowels have not collapsed completely in all American English accents, though West Coast accents tend to collapse the two phonemes. In one embodiment of the invention, the /a r/ transcription is generated as the primary transcription with the /E r/ transcription as secondary.

12. Spelling " . . . air" and " . . . are" should be /E•r/" when " . . . air" and " . . . are" are in Same Syllable As above for "or" spelling, syllabification is necessary. Again, this rule corrects incorrect transcriptions (frequently to /e•r/) of programs of the sort used at step 120. Thus, "dare" should be /d•E•r/ (rather than the unlikely /d•e•r/), ditto for words like "hair", "mare", and "stair".

13. Catch Separated Rhoticized Schwa

The two phonemes /*•r/ are sometimes generated (at step 120) when the single phoneme for the rhoticized schwa, /*r/, is appropriate. This can be detected through syllabification. The rhoticized schwa should be used when the phoneme is from a single syllable, thus /b•l•*r•d/ for "blurred" (rather than /b•l•*•r•d/), but /h•E•p•*•r•I•n/ for "heparin".

14. Derived Geminate Consonants

When a word has geminate (double) constant sounds, e.g. as in "room-mate", "flattop", "orange-juice", etc., generating the single constant transcription is an error, and thus the doubled form should be used. For example, the appropriate pronunciation for "room-mate" is /r•u•m•m•e•t/, not /r•u•m•e•t/ which suggests a word sounding like "roomate". Similarly for "flattop" a single /t/, or flap, /!/, would imply a word sounding like "flatop". Same holds for omission of either affricate in "orange-juice" which would result in something like "Orin Juice".

15. Remove Non-Existent Phonemes

Similarly, inappropriate symbols (e.g. those not appearing in the CPA, see Table 1) should be flagged, and if possible replaced. For example, one program used for step 120 (E-Speech) generates an incorrect phoneme, /ax/, for some words. That representation was used in ARPABET symbols, a predecessor representation to the CPA. In the case of an /ax/ symbol, it can be translated mostly to schwa, /*/, but the transcription can also be flagged for human review. Other inappropriate output symbols can be similarly flagged for manual review. (This rule can be applied either as part of step 140 or step 150 depending on the implementation preference.)

16. Include Epenthetic /p/ in Words Spelt "mf", "ms" and "mph"

Include an epenthetic /p/ in transcriptions of words spelt with "mf", "ms" and "mph". Thus for the word "Humphrey", the transcription /h•^•m•f•r•i/ is generated by many existing tools used by step 120. However, a better pronunciation would include the epenthetic /p/, e.g. /h•^•m•p•f•r•i/. Accordingly, such a substitution can be made. Similarly, names such as "Samson" can be better transcribed /s a m p s * n/.

17. Ensure Silent "k" in "kn" Spellings

Transcriptions of words with initial "kn" spellings should not include /k/ in the transcription. Thus, the transcription of "knave" as /k•n•e•v/ by programs of the sort used at step 120, should be modified to /n•e•v/.

18. Spelling "our" Should be /aw•*r/

The phonemes /aw•*r/ are correct transcription for spelling "our" in the words: flour, hour, lour, sour, scour, and stourbridge.

19. Spelling "our" Should be /O•r/

The phonemes /O•r/ are correct transcription for spelling "our" in the words: four, pour, and your.

20. Unstressed "ex-" is /I•k•s/ Before Consonants and /I•g•z/ Before Vowels

Syllabification and determination of stress may be necessary to select proper pronunciation. In one embodiment, an initial "ex" in spelling is flagged for human and/or automated determination of whether "ex" is stressed. Thus "explain" becomes /I•k•s•p•l•e•n/ while "examine" is /I•g•z•a•m•I•n/.

21. Initial "be", "de", "e", "re" and "pre" have Vowel /I/when Unstressed

Again, determination of stress in an automated and/or manual fashion may be necessary to correctly apply the rule.

Examples: "believe" is /b•I•l•i•v/. Ditto on /I/ for "deliver", "elaborate", "repeat", and "prefer".

22. Phonotactically Impossible Co-Occurrences

Firstly, it is relevant to note that in cases where a word has a foreign origin these rules may improperly tag a word as likely to have a phonotactically impossible transcription. Nonetheless, the advantages of identifying these impossible transcriptions outweighs the false accepts.

Detection can occur through analysis of spelling (orthography). First some notation: the twenty orthographic consonants in English are defined as C={b, c, d, f, g, h, j, k, 1, m, n, p, q, r, s, t, v, w, x, z}. The six orthographic vowels are defined as V={a, e, i, o, u, y}. Using the notation of "V" and "C to refer to orthographic vowels and consonants respectively, the orthographic phonotactic sequences that are permissible in American English can be identified as:

| Initial String | Medial String | Final String | Examples |
| --- | --- | --- | --- |
| V(C) | V(C) | V(C) | a, ahi, at |
| VV(C) | VV(C) | VV(C) | ai, aid, video |
| VVV(C) | VVV(C) | VVV(C) | aioli, mayoral, mayors [Note 1] |
| VCC | VCC | VCC | its, cats, catsup |
| VCCC | VCCC | VCCC | acts, launching, picts |
| CV | CV | CV | to, tomato |
| CCV | CCV | CCV | she, ashes, ashy |
| CCCV | CCCV | CCCV or VCCCC | straw, strewn, stretchy [Note 2]; tempts [Note 3] |

When the letter "C", appears in parenthesis that indicates that the consonant is optional. Note 1: sequences of three vowels are only possible across two syllables. Note 2: The strings of three initial consonants can be further defined as: "scl", "spl", "scr", "spr", and "str". Note 3: The strings of four final consonants can be further defined as: "mpts", "ksts" (e.g. "texts").

Thus, words whose orthography do not match these patterns are likely to generate incorrect phonemic transcriptions and can be so flagged. In one embodiment, words tagged as phonotactically impossible are provided to human transcribers with a higher priority than other words. In some embodiments, the available transcribers may have a subset who are particularly experienced, e.g. years of training, phonetics/linguistics background, etc., and words/transcriptions flagged by the above rules might automatically be delivered to them for transcription since the transcription is likely to be more complicated and/or require specialized experience.

23. Rules for Accented Characters and Diacritics

Hyphen Rule

When a word is hyphenated, the final consonant of the first word should be pronounced with a co-articulated allophone. Thus for "bird-bath" the desired transcription is /b•*r•!•b•a•T/, not /b•*r•d•b•a•T/ which would correspond to "bird bath". Similarly "bean-bag" would be correctly transcribed with the co-articulated allophone as /b•i•m•b•a•g/, not /b•i•n•b•a•g/ which would correspond to "bean bag".

Retention Accents Rule

Several languages make use of accents and letter diacritics to distinguish pronunciation of letters. For example, the cedilla in French makes a (hard) letter "c" become sibilant (soft)/s/ as in "garçon", "façade", "soupçon", and "çedilla". For the retention accents (acute, grave, circumflex, stød, cedilla, and tilde), the following rules apply:

Acute: The acute accent, as in "café" should be transcribed as /k•a•f•e/, not /k•e•f/. Thus the accent indicates that the character "é" should be pronounced /e/, not treated as a silent "e".

Grave: The grave accent as in the "à" of "déjà-vu" should be transcribed /d•e•Z•a•v•u/ as opposed to /d•E•dZ•*•v•u/. Thus for "à" the transcription should be /a/, not /*/. Similarly, for "è" the transcription should be /E/ not /e/ or silent "e". Examples include "Mégève" (a town in France), "première", etc.

Occasionally, the grave accent is used in native English words to distinguish forms that need a "poetic", or unpredictable, stress as in "learnèd" or "wingèd". However the above rule would produce the correct transcription as well, e.g. "learnèd" should be transcribed as /l *r n E d/, as opposed to "learned" or /l•*r•n•d/.

Cedilla: The cedilla accent as in "garçon" should be transcribed /g•A•r•s•O•n/ as opposed to /g•A•r•k•O•n/. As noted above, it turns an otherwise hard /k/ into the sibilant /s/.

Circumflex: The circumflex accent as in "huître" should be transcribed /w I t r/ as opposed to /h•u•I•t•r•i/. Thus, the accent indicates that the letters should be produced with vowel qualities that are close to the French original /i/, /a/, /o/ and /u/. Other examples include "pâté", "ragoût", "gîte", and "côte".

Stød: The stud character as in "Jørgensen" should be transcribed as /j•*r•g•*•n•s•*•n/ as opposed to /j•O•r•g•*•n•s•*•n/. Thus, the stød character indicates that the vowel is similar to a long schwa (/*/) and not pronounced as an orthographic "o".

Tilde: The tilde accent as in "Cañon" should be transcribed as /k•a•n•j•o•n/ as opposed to /k•a•n•*•n/. Similarly, "Saõ Paolo" should be /s•aw•u•p•aw•l•o/ as opposed to /s•aw•p•aw•l•o/. Thus, the tilde accent indicates that with respect to "ñ" that it should be pronounced similar to /n j/ and that on vowels there is a nasalization and diphthongization present.

Umlaut and Ring Accent Rules

Umlaut Accent: The umlaut accent as in "Björn" should be transcribed /b•j•*r•n/ as opposed to /b•j•O•r•n/. Some further examples (with correct transcriptions followed by incorrect transcriptions) will now be shown:

| Word | Correct | Incorrect |
| --- | --- | --- |
| Linköping | l·I·g~·S·*·p·I·g~ | l·I·g~·k·o·p·I·g~ |
| Düsseldorf | d·U·s·*·l·d·O·r·f | d·´·s·*·l·d·O·r·f |
| Müllhäuser | m·j·u·l·h·Oj·z·*r | m·¨·l·h·aw·s·*r |
| München | m·j·u·n·S·*·n | m·¨·n·tS·*·n |
| Sätra | s·e·t·r·* | s·a·t·r·* |

Thus, the umlaut indicates a change in vowel quality to match more closely the vowel in the original language pronunciation.

Occasionally, dieresis (same glyph representation as umlaut) is also used in English to distinguish vowels which belong to separate syllables, e.g. "naïve", "noël", "Chloë", and "Brontë". Omission of the dieresis might result in the wrong pronunciation, e.g. with only a single syllable. For example, /n•e•v/ for "naïve" instead of the proper /n•aj•i•v/.

Because the glyph (and ASCII/UNICODE encodings) for characters accented with umlauts and characters with dieresis marks are identical, determining the appropriate treatment may require some manual review. For example, if words are tagged according to their origin, then an automatic decision could be made to treat characters with the umlaut/dieresis glyph according to that designation. Alternatively, the approach may be selectable on a per word list basis (e.g. treat all words in this list according to umlaut rule or treat all words in this list according to dieresis rule.) This last approach may work particularly well when the word list 100 comes from a well defined data set, e.g. German city names, a list of American names, a list of common German last names, etc.

Additionally, manual involvement in generation of the initial word list 100 to manually insert diacritic marks may be appropriate prior to step 110. This may be appropriate where for example an American phonebook, or census records, have been used to obtain lists of last names (for example). In such a situation the provided data may have been reduced (through human error and/or coding limitations) to standard ASCII characters (A–Z).

Ring Accent: The ring accent as in "Århus" should be transcribed /O•h•u•s/ as opposed to /A•r•h•u•s/. Similarly "Umeå" should be transcribed /u•m•e•O/ as opposed to /j•u•m•i•*/. Thus, the ring accent indicates that Danish words should be pronounced with a vowel quality that is rounder and backer than English phonology would predict from the orthography.

Digraph Rules

The still (somewhat) common digraphs for "ae" as "æ" and for "oe" as "œ" should also be transcribed correctly. For example in "æsthetic" the preferred pronunciation should be /E•s•T•E•!•I•k/ not the pronunciation for "aesthetic" of /e•i•s•T•E•!•I•k/. Similarly, in words like "œdema", the preferred transcription should be /I•d•i•m•*/, not the pronunciation for "oedema" of /o•I•d•i•m•*/. More generally, the digraphs as a group are pronounced as single vowels, not separately.

General Comment

Similarly, it may also be appropriate to include likely mis-pronunciations, such as those generated at step 120, as a secondary variant. For example, for a Hispanic name like "Quintanilla" where many Americans might pronounce the double-l, retaining an incorrect pronunciation as a secondary or tertiary variant can be useful.

C. Implementation of Rules

The above rules can be described through one or more of regular expression substitutions, productions (e.g. this sequence of symbols becomes this), and/or rules (e.g. as described above in an appropriate form for computer implementation).

The rules that do not require syllabification can generally be implemented with straightforward regular expressions matching on a mixture of the word and the corresponding generated transcription. Rules that require syllabification (or determination of stress) may also require regular expression matching on such a representation.

For example the rule for silent /k/ for "kn" spellings could be implemented using a regular expression match for a "kn" in the word and a "k•n" in the generated transcription and then removing the "k•" from the transcription.

D. Integrated Use of Pronunciations

As noted, proper phonemic transcriptions aid automated processes such as speech recognition and text-to-speech (TTS). Additionally, pronunciations can be used to aid human voice talents in reading scripts containing various phrases with which they may be unfamiliar. This process is described in greater detail with reference to FIG. 2.

First, a script 200 is provided. The script 200 can be comprised of one or more sequences of words arranged together (each sequence of words is sometimes referred to as a prompt for voice application work). The script may be provided in one or more standard formats, e.g. text only with a single prompt per line, one or more XML markup formats, Microsoft(™) Word documents and/or any other appropriate format.

Then, at step 210, words in need of pronunciation are identified with reference to the pronunciation data 170 (and, if maintained separately, any standard pronunciation references, e.g. for standard American English). Any such words in need of pronunciation can be sent as a word list through the process of FIG. 1. Additionally, if necessary, the script 200 can be queued from further handling until the necessary pronunciations become available.

At step 220, the script can be augmented with appropriate pronunciations. Because native speakers of a language are likely to be able to pronounce common words without assistance, in some embodiments only words which fall outside a predetermined list of American English words (e.g. a supplied dictionary) are supplemented.

Thus, the script 200 may have initially looked like:

Here's your weather forecast for Marlborough, Massachusetts Mountain View, Calif.

. . .

In the above example, each prompt is on a separate line. After step 210 and step 220, the resultant augmented script 230 might look like:

Here's your weather forecast for Marlborough /m•A•r•l•b•*r•o/, Massachusetts Mountain View /m•aw•n•!•*n•v•j•u/, California Here, only "Marlborough" and "Mountain View" were augmented because the other words in the script were in the main dictionary, e.g. they are likely to be correctly pronounced by native speakers.

Notably, in the preferred embodiment, if there are multiple phonemic transcriptions for a particular word, the goldenized (preferred) transcription is selected for the augmented script 230. The output format of the augmented script 230 may use different formats. For example, in one embodiment transcriptions appear below the corresponding word rather than beside it.

The final step, step 240, involves recording the script with human voice talents. The augmented script 230 can be provided to the same (as well as to producers/directors) to ensure that words are pronounced according to the preferred pronunciation.

E. Web Based Phonemic Transcriptions

Individual application programmers that are developing voice applications may encounter several variations of the pronunciation problem: (1) they may not have direct access to the software of the type used at step 120 of FIG. 1 and (2) even having such access they may lack adequate skills to review the results and adjust pronunciations.

Accordingly, in some embodiments of the invention, a web based interface is provided to allow users to submit word lists-either explicitly or implicitly—for transcription. In one embodiment, the submission is explicit, e.g. a word list 100 is submitted, using one or more standard web based formats (e.g. URL of word list 100, HTTP file upload of word list 100, direct entry of word list into an HTML form, etc.). In other embodiments, the word list is derived from analysis of application program code such as grammars in an application. For example, if an application programmer provides the application program code for an application, the grammars identified in the application could be analyzed to generate a word list 100.

If a web-based voice application development environment is provided (see for example, U.S. patent application Ser. No. 09/592,241 entitled "Method and Apparatus for Zero-Footprint Phone Application Development", filed 13 Jun. 2000, having inventors Kunins, Jeff C., et. al., and assigned to the assignee of the present invention) then either the implicit or explicit approach can be integrated with such an environment.

In one embodiment, the transcription service is provided as a paid for service to developers. In another embodiment, developers are provided a limited number of free transcriptions. In yet another embodiment, different prices are charged whether or not human intervention is required (e.g. automatic step 120/150 pronunciations are free, but those requiring human intervention are charged). In some embodiments, developers are not provided access to the phonemic transcriptions. In some embodiments, transcriptions are batched across multiple developers, e.g. from their applications and grammars and those words that appear in at least N different locations are sent for transcription (possibly without notification to the respective developers).

Because of the competitive value of good pronunciations to the operator of a voice platform, in some embodiments, developers may only access pronunciations for those words they have paid for transcription. As an example of the value to a voice portal operator, applying the process of FIG. 1 (using humans to apply the rules and verify results) for United States equity issues (stocks) lead to a marked improvement in recognition accuracy in a grammar compared to relying on the output of a tool of the sort used at step 120 alone. Thus in such an embodiment, if developer X has "Kodak" transcribed she can see the pronunciation she paid for (or requested/received free). But developer Y cannot (unless she pays for transcription of the word, etc.)

F. Conclusion

In some embodiments, processes of FIGS. 1–2 can be implemented using hardware based approaches, software based approaches, and/or a combination of the two. In some embodiments, phonemic transcription and generation of phonemic variations are carried out using one or more computer programs that are included in one or more computer usable media such as CD-ROMs, floppy disks, or other media. In some embodiments, transcription generation programs, script handling programs, phonemic variation generation programs, script handling programs, and/or syllabification programs, are included in one or more computer usable media.

Some embodiments of the invention are included in an electromagnetic wave form. The electromagnetic waveform comprises information such as transcription generation programs, script handling programs, phonemic variation generation programs, script handling programs, and/or syllabification programs. The electromagnetic waveform may include the programs accessed over a network.

The foregoing description of various embodiments of the invention has been presented for purposes of illustration and description. It is not intended to limit the invention to the precise forms disclosed. Many modifications and equivalent arrangements will be apparent.

What is claimed is:

1. A method of generating a phonemic transcription for a word using a computer system, the method comprising:

providing the word to a first computer program, the first computer program generating a first phonemic transcription for the word;

applying a first rule to the first phonemic transcription to detect a phonotactically impossible transcription; and if the phonotactically impossible transcription is detected for the first phonemic transcription, then applying a second rule to the first phonemic transcription to generate a second phonemic transcription based upon at least one of the word or the first phonemic transcription.

2. The method of claim 1, wherein the first computer program is provided by a first legal entity and wherein the method is applied by a second legal entity distinct from the first legal entity.

3. The method of claim 1, wherein the first rule comprises a rule for detecting character sequences in the first phonemic transcription that do not correspond to valid phonemes according to the Computer Phonetic Alphabet (CPA).

4. The method of claim 1, wherein the first rule comprises a rule for examining the word orthographically to identify sequences likely to result in phonotactically impossible co-occurrences.

5. The method of claim 1, wherein the second rule comprises a rule which detects a spelling selected from a set that includes "mf", "ms" and "mph" in the word and wherein the second phonemic transcription includes an epenthetic /p/.

6. The method of claim 1, wherein the second rule comprises a rule which detects a spelling of "kn" in the word and wherein the second phonemic transcription does not include a /k/.

7. A method of claim 1, wherein the second rule comprises a rule which determines whether a spelling "or" in the word occurs in a single syllables, and, responsive to the determinations sets the second phonemic transcription to /O•r/ when the spelling occurs in a single syllable.

8. The method of claim 1, wherein the second rule is selected from a set of rules including:

a rule for transcribing an "or" spelling as /O•r/ when the "or" spelling is in a single syllable;

a rule for transcribing a "wa" spelling as /w•O/";

a rule preferring /O/ over /A/ after labio-velars and before velarized laterals;

a rule for handling /O/-/A/ preference for Non-Germanic and Non-English derived words;

a rule listing words having an /O/ variant as primary and an /A/ variant as secondary;

a rule listing words having the /A/ variant as primary and the /O/ variant as secondary;

a rule to avoid over-rhoticizing adjacent r-colored vowels; or a rule for generating a flapped variant for fully released /t/ and /d/ sounds and preferring the flapped variant.

9. The method of claim 1, wherein the second rule is selected from a set of rules including:

a rule for handling unstressed vowels /*/ and /I/;

a rule for using /^/ for stressed central vowels;

a rule for transcribing an "ar" spelling as /a•r/ when the "ar" spelling is in a single syllable;

a rule for transcribing " . . . air" and " . . . are" spellings as /E•r/;

a rule for identifying a separated rhoticized schwa;

a rule for handling derived geminate consonants;

a rule for including epenthetic /p/ in words spelt using "mf", "ms" and "mph";

a rule to ensure a silent /k/ in transcriptions of words having an initial "kn" spelling;
a rule for transcribing a spelling "our" for a first set of words as /O•r/;
a rule for transcribing a spelling "our" for a second set of words as /aw•*r/;
a rule for handling an initial "ex" spelling; or
a rule for handling at least one of an initial "be", "de", "e", "re", or "pre" spelling.

10. The method of claim 1, wherein the second rule is selected from a set of rules including:
a rule for handling hyphenated words;
a rule for handling acute accents;
a rule for handling grave accent;
a rule for handling çedilla accent;
a rule for handling circumflex accent;
a rule for handling stød character;
a rule for handling tilde accent;
a rule for handling umlaut accent;
a rule for handling dieresis;
a rule for handling ring accent; or a rule for handling digraphs.

11. A system for generating a phonemic transcription for a word, the system comprising:
a device:
generating a first phonemic transcription for the word,
applying a first rule to the first phonemic transcription to detect a phonotactically impossible transcription, and
applying a second rule to the first phonemic transcription, if the phonotactically impossible transcription is detected, to generate a second phonemic transcription based upon at least one of the word or the first phonemic transcription.

12. The system of claim 11, wherein the first rule comprises a rule for detecting character sequences in the first phonemic transcription that do not correspond to valid phonemes according to the Computer Phonetic Alphabet (CPA).

13. The system of claim 11, wherein the first rule comprises a rule for examining the word orthographically to identify sequences likely to result in phonotactically impossible co-occurrences.

14. The system of claim 11, wherein the second rule comprises a rule which detects a spelling selected from a set that includes "mf", "ms" and "mph" in the word and wherein the second phonemic transcription includes an epenthetic /p/.

15. The system of claim 11, wherein the second rule comprises a rule which detects a spelling of "kn" in the word and wherein the second phonemic transcription does not include a /k/.

16. A system of claim 11, wherein the second rule comprises a rule which determines whether a spelling "or" in the word occurs in a single syllable, and, responsive to the determination, sets the second phonemic transcription to /O•r/ when the spelling occurs in a single syllable.

17. The system of claim 11, wherein the second rule includes at least one of:
a rule for transcribing an "or" spelling as /O•r/ when the "or" spelling is in a single syllable;
a rule for transcribing a "wa" spelling as /w•O/";
a rule preferring /O/ over /A/ after labio-velars and before velarized laterals;
a rule for handling /O/ - /A/ preference for Non-Germanic and Non-English derived words;
a rule listing words having an /O/ variant as primary and an /A/ variant as secondary;
a rule listing words having the /A/ variant as primary and the /O/ variant as secondary;
a rule to avoid over-rhoticizing adjacent r-colored vowels; or
a rule for generating a flapped variant for fully released /t/ and /d/ sounds and preferring the flapped variant.

18. The system of claim 11, wherein the second rule includes at least one of:
a rule for handling unstressed vowels /*/ and /I/;
a rule for using /0/ for stressed central vowels;
a rule for transcribing an "ar" spelling as /a•r/ when the "ar" spelling is in a single syllable;
a rule for transcribing " . . . air" and " . . . are" spellings as /E·r/;
a rule for identifying a separated rhoticized schwa;
a rule for handling derived geminate consonants;
a rule for including epenthetic /p/ in words spelt using "mf", "ms" "mph";
a rule to ensure a silent /k/ in transcriptions of words having an initial "kn" spelling;
a rule for transcribing a spelling "our" for a first set of words as /O•r/;
a rule for transcribing a spelling "our" for a second set of words as /aw•*r/;
a rule for handling an initial "ex" spelling; or
a rule for handling at least one of an initial "be", "de", "e", "re", or "pre" spelling.

19. The system of claim 11, wherein the second rule includes at least one of:
a rule for handling hyphenated words;
a rule for handling acute accents;
a rule for handling grave accent;
a rule for handling çedilla accent;
a rule for handling circumflex accent;
a rule for handling stød character;
a rule for handling tilde accent;
a rule for handling umlaut accent;
a rule for handling dieresis;
a rule for handling ring accent; or
a rule for handling digraphs.

20. A computer-readable storage device that stores computer-executable code for generating a phonemic transcription for a word, the code comprising:
instructions for generating a first phonemic transcription for the word;
instructions for applying a first rule to the first phonemic transcription for identifying a phonotactically impossible transcription for the first phonemic transcription; and
instructions for applying a second rule to the first phonemic transcription to generate a second phonemic transcription based upon at least one of the word or the first phonemic transcription if the phonotactically impossible transcription is detected for the first phonemic transcription.

21. The computer-readable storage device of claim 20, wherein the first rule comprises a rule for detecting character sequences in the first phonemic transcription that do not correspond to valid phonemes according to the Computer Phonetic Alphabet (CPA).

22. The computer-readable storage device of claim 20, wherein the first rule comprises a rule for examining the word orthographically to identify sequences likely to result in phonotactically impossible co-occurrences.

23. The computer-readable storage device of claim 20, wherein the second rule comprises a rule which detects a spelling selected from a set that includes "mf", "ms" and "mph" in the word and wherein the second phonemic transcription includes an epenthetic /p/.

24. The computer-readable storage device of claim 20, wherein the second rule comprises a rule which detects a spelling of "kn" in the word and wherein the second phonemic transcription does not include a /k/.

25. The computer-readable storage device of claim 20, wherein the second rule comprises a rule which determines whether a spelling "or" in the word occurs in a single syllable, and, responsive to the determination, sets the second phonemic transcription to /O•r/ when the spelling occurs in a single syllable.

26. The computer-readable storage device of claim 20, wherein the second rule includes at least one of:
   a rule for transcribing an "or" spelling as /O•r/ when the "or" spelling is in a single syllable;
   a rule for transcribing a "wa" spelling as /w•O/";
   a rule preferring /O/ over /A/ after labio-velars and before velarized laterals;
   a rule for handling /O/–/A/ preference for Non-Germanic and Non-English derived words;
   a rule listing words having an /O/ variant as primary and an /A/ variant as secondary;
   a rule listing words having the /A/ variant as primary and the /O/ variant as secondary;
   a rule to avoid over-rhoticizing adjacent r-colored vowels; or
   a rule for generating a flapped variant for fully released /t/ and /d/ sounds and preferring the flapped variant.

27. The computer-readable storage device of claim 20, wherein the second rule includes at least one of:
   a rule for handling unstressed vowels /*/ and /I/;
   a rule for using /ô/ for stressed central vowels;
   a rule for transcribing an "ar" spelling as /a•r/ when the "ar" spelling is in a single syllable;
   a rule for transcribing " . . . air" and " . . . are" spellings as /E•r/;
   a rule for identifying a separated rhoticized schwa;
   a rule for handling derived geminate consonants;
   a rule for including epenthetic /p/ in words spelt using "mf", "ms" and "mph";
   a rule to ensure a silent /k/ in transcriptions of words having an initial "kn" spelling;
   a rule for transcribing a spelling "our" for a first set of words as /O•r/;
   a rule for transcribing a spelling "our" for a second set of words as /aw•*r/;
   a rule for handling an initial "ex" spelling; or
   a rule for handling at least one of an initial "be", "de", "e", "re", or "pre" spelling.

28. The computer-readable storage device of claim 20, wherein the second rule includes at least one of:
   a rule for handling hyphenated words;
   a rule for handling acute accents;
   a rule for handling grave accent;
   a rule for handling çedilla accent;
   a rule for handling circumflex accent;
   a rule for handling stød character;
   a rule for handling tilde accent;
   a rule for handling umlaut accent;
   a rule for handling dieresis;
   a rule for handling ring accent; or
   a rule for handling digraphs.

29. The computer-readable storage device of claim 20, wherein the instructions for generating the first phonemic transcription include instructions for applying at least one of:
   a rule for including an epenthetic /p/ in transcriptions of words spelt using "mf", "ms" and "mph";
   a rule for ensuring a silent /k/ in words with initial "kn" spellings;
   a rule for transcribing an "or" spelling as /O•r/ when the "or" spelling is in a single syllable;
   a rule for transcribing a "wa" spelling as /w•O/;
   a rule for removing over-rhoticized adjacent r-colored vowels;
   a rule for applying an unstressed vowel selection rule;
   a rule for using a /ô/ transcription for stressed central vowels;
   a rule for correcting separated rhoticized schwa; or
   a rule for using double consonant sounds for derived geminate constants.

30. A device comprising:
   a memory to store instructions; and
   a processor to execute the instructions to:
      generate a first phonemic transcription for a word,
      apply a first rule to the first phonemic transcription to detect a phonotactically impossible transcription, and
      apply a second rule to the first phonemic transcription, if the phonotactically impossible transcription is detected, to generate a second phonemic transcription based upon at least one of the word or the first phonemic transcription.

31. The device of claim 30, wherein the first rule comprises a rule for detecting character sequences in the first phonemic transcription that do not correspond to valid phonemes according to the Computer Phonetic Alphabet (CPA).

32. The device of claim 30, wherein the first rule comprises a rule for examining the word orthographically to identify sequences likely to result in phonotactically impossible co-occurrences.

33. The device of claim 30, wherein the second rule comprises a rule which detects a spelling selected from a set that includes "mf", "ms" and "mph" in the word and wherein the second phonemic transcription includes an epenthetic /p/.

34. The device of claim 30, wherein the second rule comprises a rule which detects a spelling of "of" in the word and wherein the second phonemic transcription does not include a /k/.

35. The device of claim 30, wherein the second rule comprises a rule which determines whether a spelling "or" in the word occurs in a single syllable, and, responsive to the determination, sets the second phonemic transcription to /O•r/ when the spelling occurs in a single syllable.

36. The device of claim 30, wherein the second rule includes at least one of:
   a rule for transcribing an "or" spelling as /O•r/ when the "or" spelling is in a single syllable;
   a rule for transcribing a "wa" spelling as /w•O/";
   a rule preferring /O/ over /A/ after labio-velars and before velarized laterals;
   a rule for handling /O/–/A/ preference for Non-Germanic and Non-English derived words;
   a rule listing words having an /O/ variant as primary and an /A/ variant as secondary;
   a rule listing words having the /A/ variant as primary and the /O/ variant as secondary;
   a rule to avoid over-rhoticizing adjacent r-colored vowels; or
   a rule for generating a flapped variant for fully released /t/ and /d/ sounds and preferring the flapped variant.

37. The device of claim 30, wherein the second rule includes at least one of:
- a rule for handling unstressed vowels /*/ and /I/;
- a rule for using /ô/ for stressed central vowels;
- a rule for transcribing an "ar" spelling as /a•r/ when the "ar" spelling is in a single syllable;
- a rule for transcribing " . . . air" and " . . . are" spellings as /E•r/;
- a rule for identifying a separated rhoticized schwa;
- a rule for handling derived geminate consonants;
- a rule for including epenthetic /p/ in words spelt using "mf", "ms" and "mph";
- a rule to ensure a silent /k/ in transcriptions of words having an initial "kn" spelling;
- a rule for transcribing a spelling "our" for a first set of words as /O•r/;
- a rule for transcribing a spelling "our" for a second set of words as /aw•*r/;
- a rule for handling an initial "ex" spelling; or
- a rule for handling at least one of an initial "be", "de", "e", "re", or "pre" spelling.

38. The device of claim 30, wherein the second rule includes at least one of:
- a rule for handling hyphenated words;
- a rule for handling acute accents;
- a rule for handling grave accent;
- a rule for handling çedilla accent;
- a rule for handling circumflex accent;
- a rule for handling stød character;
- a rule for handling tilde accent;
- a rule for handling umlaut accent;
- a rule for handling dieresis;
- a rule for handling ring accent; or
- a rule for handling digraphs.

39. The device of claim 30, wherein the instructions for generating the first phonemic transcription includes instructions for applying at least one of:
- a rule for including an epenthetic /p/ in transcriptions of words spelt using "mf", "ms" and "mph";
- a rule for ensuring a silent /k/ in words with initial "kn" spellings;
- a rule for transcribing an "or" spelling as /O•r/ when the "or" spelling is in a single syllable;
- a rule for transcribing a "wa" spelling as /w•O/;
- a rule for removing over-rhoticized adjacent r-colored vowels;
- a rule for applying an unstressed vowel selection rule;
- a rule for using a /ô/ transcription for stressed central vowels;
- a rule for correcting separated rhoticized schwa; or
- a rule for using double consonant sounds for derived geminate constants.

* * * * *